(No Model.)
S. A. MILLER.
DRAFT EQUALIZER.
No. 554,285.  Patented Feb. 11, 1896.
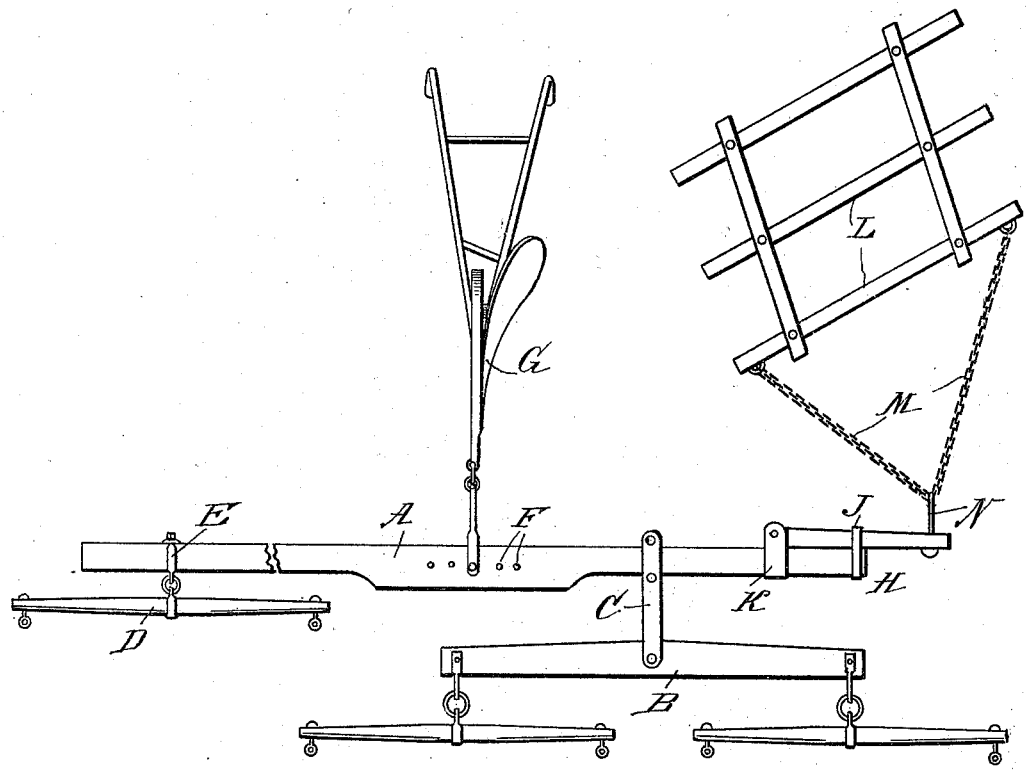
WITNESSES
Theo. Hiller
[signature]
INVENTOR
Stephen A. Miller
By W. K. Miller
Attorney

United States Patent Office.

STEPHEN A. MILLER, OF PLAIN, OHIO, ASSIGNOR OF ONE-HALF TO ABRAHAM O. MILLER, OF SAME PLACE.

DRAFT-EQUALIZER.

SPECIFICATION forming part of Letters Patent No. 554,285, dated February 11, 1896.

Application filed December 9, 1895. Serial No. 571,529. (No model.)

*To all whom it may concern:*

Be it known that I, STEPHEN A. MILLER, a citizen of the United States, and a resident of Plain, county of Wayne, State of Ohio, have invented a new and useful Improvement in Equalizers, of which the following is a full, clear, and exact description, reference being had to the accompanying drawing, making part of this specification.

My invention relates to certain improvements in equalizers, especially adapted to equalize the draft of the team when operating a plow and harrow.

With these ends in view my invention relates to certain features of construction and combination of parts, as will hereinafter be described and claimed.

The accompanying drawing is a plan view of the equalizer, showing plow and harrow attached, A representing the equalizing beam or bar, having the front and rear sides of its end portions parallel, to which the doubletree B, which may be of the ordinary construction for two horses, is adjustably secured by the slidable clip C, which in this case is shown on the left-hand end of the bar A. On the right-hand end of said bar is adjustably secured a singletree D, by a slidable clip E, to which is hitched a single horse.

Central to the bar A is provided a series of apertures F to receive the clevis-pin by which the plow G is hitched to the equalizing-bar A. At the left-hand end of the bar A is provided an extensible bar H, adjustably secured to said bar by the clips J and K. To the outer end of the bar H is hitched the harrow L by the chain M. The harrow may be moved to or from the plow by slackening the binding-bolt in the clip K and moving the clip and bar H on the equalizer-bar A, and to change the line of draft or position of the harrow the point of hitching the chain to the hook N may be to the right or left of the point of contact shown.

As before stated, the object of the invention is to provide an equalizer whereby the draft of a harrow and a plow may be equally placed on the shoulders of three horses. The draft of the plow being greater than the harrow, the third horse is hitched to the right to walk on the land side of the plow to draw on the plow and against the two horses hitched to the doubletree B, the nigh horse in this case walking in the furrow, to plow and harrow the ground at the same time, thereby saving much time and expense.

It will be noticed that the hitch of the plow to the equalizer-bar may be changed to the right or left, and the hitch of the horses, by moving the clips C E on the bars.

Having thus fully described the nature and object of my invention, what I claim is—

The combination with the equalizer-bar A, having its end portions parallel, of the double and single trees adjustably secured thereto by the slidable clips C, E, the extensible bar H, and clips J and K, whereby the draft of the harrow and plow may be equalized on the team, substantially as set forth.

In testimony whereof I have hereunto set my hand this 30th day of November, A. D. 1895.

STEPHEN A. MILLER.

Witnesses:
W. K. MILLER,
CHAS. M. BALL.